(12) United States Patent
Purcell et al.

(10) Patent No.: US 10,218,652 B2
(45) Date of Patent: Feb. 26, 2019

(54) SYSTEMS AND METHODS FOR INTEGRATING A CHAT FUNCTION INTO AN E-READER APPLICATION

(71) Applicant: MasterCard International Incorporated, Purchase, NY (US)

(72) Inventors: Kimberly Purcell, Wilton, CT (US); Malavika Singh, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 434 days.

(21) Appl. No.: 14/821,266

(22) Filed: Aug. 7, 2015

(65) Prior Publication Data

US 2016/0043974 A1     Feb. 11, 2016

Related U.S. Application Data

(60) Provisional application No. 62/035,001, filed on Aug. 8, 2014.

(51) Int. Cl.
| | |
|---|---|
| *H04L 12/58* | (2006.01) |
| *H04L 29/06* | (2006.01) |
| *G06F 3/0483* | (2013.01) |
| *G06F 3/0482* | (2013.01) |
| *G06F 3/0484* | (2013.01) |

(52) U.S. Cl.
CPC .......... *H04L 51/046* (2013.01); *G06F 3/0482* (2013.01); *G06F 3/0483* (2013.01); *G06F 3/04842* (2013.01); *H04L 65/1003* (2013.01); *H04L 65/403* (2013.01)

(58) Field of Classification Search
CPC . H04L 51/046; H04L 65/1003; H04L 65/403; G06F 3/0482; G06F 3/0483; G06F 3/04842
See application file for complete search history.

(56) References Cited

U.S. PATENT DOCUMENTS

| | | | |
|---|---|---|---|
| 8,520,025 B2 | 8/2013 | Patterson et al. | |
| 8,543,941 B2 | 9/2013 | Patterson et al. | |
| 8,892,630 B1 | 11/2014 | Curtis | |
| 9,063,641 B2 | 6/2015 | Patterson et al. | |
| 2003/0009459 A1* | 1/2003 | Chastain | G06F 17/241 |
| 2006/0161666 A1* | 7/2006 | Cohen | H04L 12/1831 |
| | | | 709/229 |

(Continued)

*Primary Examiner* — Mandrita Brahmachari
(74) *Attorney, Agent, or Firm* — Armstrong Teasdale LLP

(57) ABSTRACT

An e-reader communication platform for integrating a chat function into an e-reader application is provided. The e-reader communication platform includes a processor programmed to upload, to a first client device associated with a first user, an e-book. The processor is also programmed to transmit a first IP chat message to a second client device associated with a second user to form a chat group including the first and second users. The processor is further programmed to receive a second IP chat message from the user interface of the e-reader application on the first client device, and embed the second IP chat message into the e-book to produce an embedded IP chat message. The embedded IP chat message is overlaid on the user interface of the e-reader application. The processor is further programmed to facilitate display of the embedded IP chat message to the chat group within the e-reader application.

17 Claims, 13 Drawing Sheets

(56) References Cited

U.S. PATENT DOCUMENTS

| | | |
|---|---|---|
| 2010/0030578 A1 | 2/2010 | Siddique et al. |
| 2012/0171653 A1 | 7/2012 | Kwon et al. |
| 2012/0221938 A1 | 8/2012 | Patterson et al. |
| 2012/0221968 A1 | 8/2012 | Patterson et al. |
| 2013/0066750 A1 | 3/2013 | Siddique et al. |
| 2013/0117667 A1* | 5/2013 | Pallakoff ........... G06F 17/30011 715/273 |
| 2013/0215116 A1 | 8/2013 | Siddique et al. |
| 2013/0262973 A1 | 10/2013 | Patterson et al. |
| 2013/0311867 A1 | 11/2013 | Patterson et al. |
| 2014/0006289 A1* | 1/2014 | Puthenveetil .......... G06Q 20/40 705/71 |
| 2014/0033030 A1* | 1/2014 | Pfister .................. G06F 17/212 715/273 |
| 2014/0033128 A1 | 1/2014 | Patterson et al. |
| 2014/0047308 A1 | 2/2014 | Chub et al. |
| 2014/0047332 A1 | 2/2014 | Liu et al. |
| 2014/0058939 A1* | 2/2014 | Savla .................. G06Q 20/227 705/42 |
| 2015/0378533 A1* | 12/2015 | Landau ................ G06F 3/0483 715/776 |

\* cited by examiner

SYSTEMS AND METHODS FOR INTEGRATING A CHAT FUNCTION INTO AN E-READER APPLICATION

CROSS-REFERENCE TO RELATED APPLICATIONS

This application claims the benefit of U.S. Provisional Application No. 62/035,001, filed Aug. 8, 2014, which is hereby incorporated by reference in its entirety.

BACKGROUND

The field of the disclosure relates generally to the use of client applications ("apps"), and, more particularly, to integrating an Internet Protocol (IP) chat function into an e-reader application.

The use of text message systems (e.g., Short Message Service, SMS), instant messaging systems, chat systems, e-mail systems, and other wireless or online communication systems are in widespread, ubiquitous use. Users of client devices, such as smart phones, PCs, tablets, etc., utilize these wireless communication systems to stay connected with friends, family, coworkers, and more, throughout the day and all across the world. These communication systems enable near-instant communication of text-based messages, pictures, links, media files, and more.

Users of client devices also embrace e-reader technology, available in many formats including through client applications and web browsers, which offers an alternative to the traditional "hard copy" book. E-reader applications grant users access to millions of pages of documents, including books, magazines, journals, newspapers, and more, a feat which would be impossible to manage if all the aforementioned documents had to be available in "hard copy" format. Avid readers appreciate the ability to carry dozens of books without having to bear the weight of those books, but rather only the weight of their client device. Pop culture aficionados appreciate the instant access to the newest news and culture publications without having to travel to a store or newsstand to purchase those publications. Students can also use e-reader applications for storing and using school books, including textbooks and novels. E-reader applications grant their users endless opportunity to consume text-based media.

BRIEF DESCRIPTION

In one aspect, a method for integrating a chat function into an e-reader application using an e-reader communication platform is provided. The method includes uploading, to a first client device, an e-book. The first client device is associated with a first user, and the e-book is accessed using the e-reader application. The method also includes transmitting a first IP chat message, initiated on the first client device, to a second client device associated with a second user to form a chat group including the first user and the second user. The method further includes receiving a second IP chat message from the user interface of the e-reader application on the first client device, and embedding the second IP chat message into the e-book to produce an embedded IP chat message. The embedded IP chat message is overlaid on the user interface of the e-reader application. The method still further includes facilitating display of the embedded IP chat message to each user in the chat group on a respective client device within the user interface of the e-reader application.

In another aspect, an e-reader communication platform for integrating a chat function into an e-reader application is provided. The e-reader communication platform includes at least one processor in communication with at least one memory device. The processor is programmed to upload, to a first client device, an e-book. The first client device is associated with a first user, and the e-book is accessed using the e-reader application. The processor is also programmed to transmit a first IP chat message, initiated on the first client device, to a second client device associated with a second user to form a chat group including the first user and the second user, and receive a second IP chat message from the user interface of the e-reader application on the first client device. The processor is further programmed to embed the second IP chat message into the e-book to produce an embedded IP chat message. The embedded IP chat message is overlaid on the user interface of the e-reader application. The processor is also programmed to facilitate display of the embedded IP chat message to each user in the chat group on a respective client device within the user interface of the e-reader application.

In yet another aspect, a computer-readable storage medium having computer-executable instructions embodied thereon is provided. When executed by an e-reader communication platform including a processor in communication with a memory, the computer-executable instructions cause the e-reader communication platform to upload, to a first client device, an e-book. The first client device is associated with a first user, and the e-book is accessed using the e-reader application. The computer-executable instructions further cause the e-reader communication platform to transmit a first IP chat message, initiated on the first client device, to a second client device associated with a second user to form a chat group including the first user and the second user, and receive a second IP chat message from the user interface of the e-reader application on the first client device. The computer-executable instructions also cause the e-reader communication platform to embed the second IP chat message into the e-book to produce an embedded IP chat message. The embedded IP chat message is overlaid on the user interface of the e-reader application. In addition, the computer-executable instructions cause the e-reader communication platform to facilitate display of the embedded IP chat message to each user in the chat group on a respective client device within the user interface of the e-reader application.

In one aspect, a computer-implemented method for providing Internet Protocol (IP) or real-time chat message functionality within a user interface of an e-reader application is provided. The method includes downloading, by a first user, an e-book from the e-reader application to a client device associated with the first user. The method further includes forming, by the first user, a chat group. The method also includes launching, by the first user, the e-reader application. The method still further includes submitting, by the first user, a first embedded IP chat message from within the e-reader application. An embedded IP chat message is an IP chat message overlaid on the user interface of the e-reader application at a location selected by the first user and is displayed to the chat group.

In another aspect, a computer system for providing Internet Protocol (IP) or real-time chat message functionality within a user interface of an e-reader application is provided. The computer system includes a server system in communication with a plurality of client devices. The server system includes an Internet Protocol (IP) communication service server and an e-reader application server. The IP communication service server is in communication with the e-reader application server. The server system is configured to receive a request to transmit an e-book from the e-reader application server to a client device, and transmit the e-book from the e-reader application server to the client device. The server system is also configured to transmit a request to form a chat group, wherein the chat group includes a plurality of users associated with the plurality of client devices. The server system is further configured to generate the chat group, wherein generating the chat group includes initiating a first IP chat message within an IP chat service. The first IP chat message is accessible through a user interface of the IP chat service. The server system is also configured to generate a first embedded IP chat message within the e-reader application, wherein an embedded IP chat message is overlaid on the user interface of the e-reader application at a location selected by a user and is displayed to the chat group.

In yet another aspect, computer-readable media for providing Internet Protocol (IP) or real-time chat message functionality within a user interface of an e-reader application is provided. The computer-readable media is configured to download an e-book from the e-reader application to a client device. The computer-readable media is also configured to launch the e-reader application on the client device, and transmit a first embedded IP chat message within the e-reader application. An embedded IP chat message is overlaid on the user interface of the e-reader application at a location selected by a first user and is displayed to a chat group. The chat group is formed by initiating a first IP chat message on a plurality of client devices, wherein the first IP chat message is accessible through a user interface of an IP chat service.

DETAILED DESCRIPTION OF THE DISCLOSURE

Figure 1:
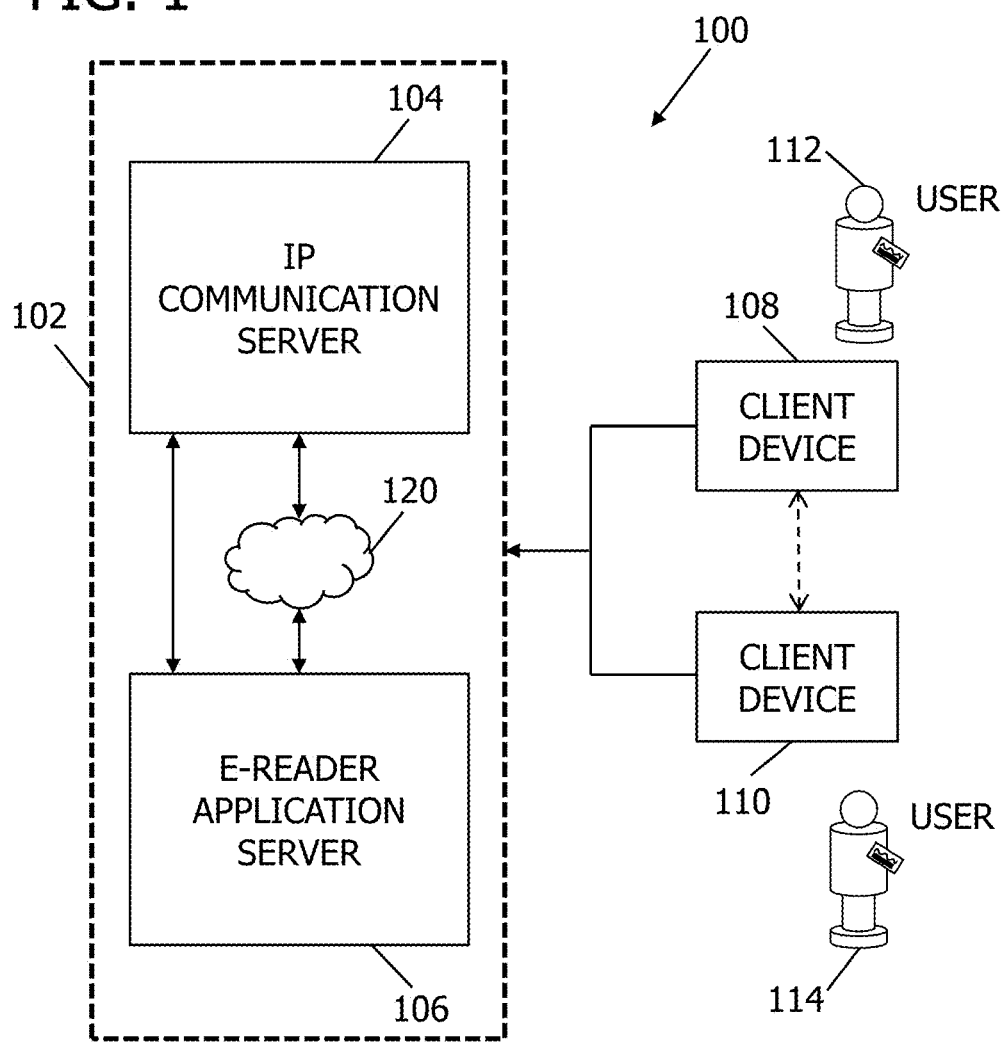
FIG. 1 is a block diagram of an example integrated e-reader communication system including an e-reader communication platform that includes an IP communication server and an e-reader application server.

The systems and methods described herein relate to the use of an Internet Protocol (IP) communication service and an e-reader application accessible on a plurality of client devices in communication with each other. In particular, the systems and methods described herein are directed to the incorporation of an IP communication service (e.g., instant messaging or real-time messaging service wherein messages are sent using an IP connection) into a user interface of the e-reader application. "Instant" or "real-time" generally refers to actions taken and completed substantially instantaneously, or without consider wait time.

The systems and methods described herein may be implemented by an e-reader communication platform that is accessible to users via user computing devices or "client devices." The e-reader communication platform facilitates integration of the IP communication service into the user interface of the e-reader application such that users of the e-reader application may communicate with members of a chat group without having to access a separate messaging application. The e-reader communication platform provides IP chat functionality to the members of the chat group using embedded IP chat messages within an e-book being read by any or all of the members of the group. In an example embodiment, one user highlights a passage of interest and associates an embedded IP chat message with the highlighted passage. The embedded IP chat message is viewable by all members of the chat group, and those members may respond and interact with other members of the group within the embedded message. There is no need for group members to constantly switch between a texting (e.g., SMS) or other messaging application, which is disruptive to the reading experience. Accordingly, the e-reader communication platform facilitates more convenient communication between users. A sense of community and connection between the users may be enhanced, as passage of interest in the e-book is readily available during intra-group conversation.

The methods and systems described herein may be implemented using computer programming or engineering techniques including computer software, firmware, hardware, or any combination or subset therefor. At least one of the technical problems addressed by this system includes: (i) the need to continually switch between e-reader and communication applications to converse with others about an e-book; and (ii) the disruptive nature of removing focus from an e-book to converse about it.

The technical effect of the system is achieved by: (i) uploading, to a first client device, an e-book, wherein the first client device is associated with a first user, and wherein the e-book is accessed using the e-reader application; (ii) transmitting a first IP chat message, initiated on the first client device, to a second client device associated with a second user to form a chat group including the first user and the second user; (iii) receiving a second IP chat message from the user interface of the e-reader application on the first client device; (iv) embedding the second IP chat message into the e-book to produce an embedded IP chat message, wherein the embedded IP chat message is overlaid on the user interface of the e-reader application; and (v) facilitating display of the embedded IP chat message to each user in the chat group on a respective client device within the user interface of the e-reader application.

The resulting technical effect achieved is at least one of: (i) a single, unified application that integrates communication and e-reader functionality; and (ii) seamless conversation associated with the subject of that conversation within an e-reader application.

The following detailed description illustrates embodiments of the disclosure by way of example and not by way of limitation. It is contemplated that the embodiments have general application to combining IP communication and e-reader technology, and processing financial transaction data by a third party in industrial, commercial, and residential applications.

Described herein are computer systems such as a spend analysis computing device and related computer systems. As described herein, all such computer systems include a processor and a memory. However, any processor in a computing device referred to herein may also refer to one or more processors, wherein the processor may be in one computing device or a plurality of computing devices acting in parallel. Additionally, any memory in a computing device referred to herein may also refer to one or more memories, wherein the memories may be in one computing device or a plurality of computing devices acting in parallel.

As used herein, a processor may include any programmable system including systems using microcontrollers, reduced-instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term "database." Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

The systems and processes are not limited to the specific embodiments described herein. In addition, components of each system and each process can be practiced independently and separate from other components and processes described herein. Each component and process also can be used in combination with other assembly packages and processes.

FIG. 1 is a block diagram of an example integrated e-reader communication system 100 including an e-reader communication platform 102 that includes an IP communication server 104 and an e-reader application server 106. The integrated e-reader communication system 100 also includes client devices 108, 110 operated by users 112, 114. In the example embodiment, any or all of the IP communication functions described herein may be performed by the IP communication server 104, and any or all of the e-reader functions may be performed by the e-reader application server 106. The IP communication server 104 and the e-reader application server 106 may be communicatively coupled, for example, by a wireless or wired network connection, and either server 104, 106 may receive or send data to or from the other using cloud resources 120. For example, an IP chat message that originates at client device 108 may be received initially by the IP communication server, which may store the message at the cloud resource 120 such that it may be accessed by any component of e-reader communication platform 102 and/or by another client device 110. As used herein, "client device" could be any device capable of interconnecting to the Internet, including, but not limited to, smart phones, cell phones, tablets, "phablets," PDAs, personal computers, laptops, netbooks, wearables, or other web-based connectable equipment. E-reader communication platform 102 may be a server computer that integrates functions of IP communication server 104 and e-reader application server 106.

As used herein, "IP communication server" includes server architecture utilized to enable an IP communication service to function. As used herein, "IP communication service" includes any client application ("app") or similar software that is configured to allow voice-over and text-based communication over the Internet using, for example, wireless (e.g., Wi-Fi) or wired connections (i.e., without the use of telephone or cell phone networks). As used herein, "e-reader application server" includes server architecture utilized to enable e-reader applications or software to function. "E-reader application" includes any application or similar software that offers electronic books and similar text-based media over any kind of client device. Accordingly, where "e-book" is used herein, it should be understood to mean any media viewable using the e-reader app. As used herein, "application" or "app" refers to a self-contained program or piece of software designed to fulfill a particular purpose that is downloaded by a user to a client device.

The e-reader communication platform 102 is configured to manage communication between users 112, 114 over client devices 108, 110 and to provide the content of the e-reader application to the client device 108, 110. In the example embodiment, user 112 uses client device 108 to access the e-reader application to download and/or read an e-book. E-reader communication platform 102 may accordingly upload the downloaded or purchase e-book to client device 108. User 112 may wish to start a chat group with user 114 in order to read the e-book together and to converse about the e-book during their reading experience. Accordingly, user 112 may prepare and send an invitation to form a chat group with user 114 using an IP chat message (a first IP chat message). E-reader communication platform 102 may receive the IP chat message and transmit the message to client device 110. E-reader communication platform 102 also forms (e.g., maintains group-accessible IP chat messages) the chat group, for example, upon acceptance of the IP chat message and/or the invitation contained therein by user 114.

While user 112 is reading the e-book, they may wish to communicate with the chat group about a particular passage of text. User 112 may highlight a passage of text to draw attention to the passage. User 112 initiates another IP chat message (a second IP chat message), wherein the second IP chat message is prepared and sent from within the user interface of the e-reader application. The second IP chat message may be, for example, a comment about the passage. E-reader communication platform 102 receives the second IP chat message and embeds the second IP chat messages into the e-book (e.g., near to or associated with the passage of text of interest) within the e-reader application on client device 108. As such, the e-reader communication platform 102 converts the second IP chat message into an "embedded IP chat message." E-reader communication platform 102 is configured to make embedded IP chat message accessible to all members of the chat group on their respective client device. In particular, e-reader communication platform 102 is configured to facilitate display of the embedded IP chat message within the user interface of the e-reader application on client device 110 of user 114. If user 112 also highlighted the passage of text, e-reader communication platform 102 may further facilitate display of the highlighting to all members of the chat group.

While user 114 is reading the e-book, they may come across the embedded IP chat message and/or the highlighting created by user 112. User 114 may read a comment written by user 112 and may read a highlighted passage more carefully. If user 114 wants to respond to the comment in the embedded IP chat message, user 114 may prepare and send a reply directly within the embedded IP chat message. E-reader communication platform 102 receives the reply, embeds the reply, and facilitates display of the comment and the reply (i.e., the conversation) to all members of the chat group.

Figure 2:
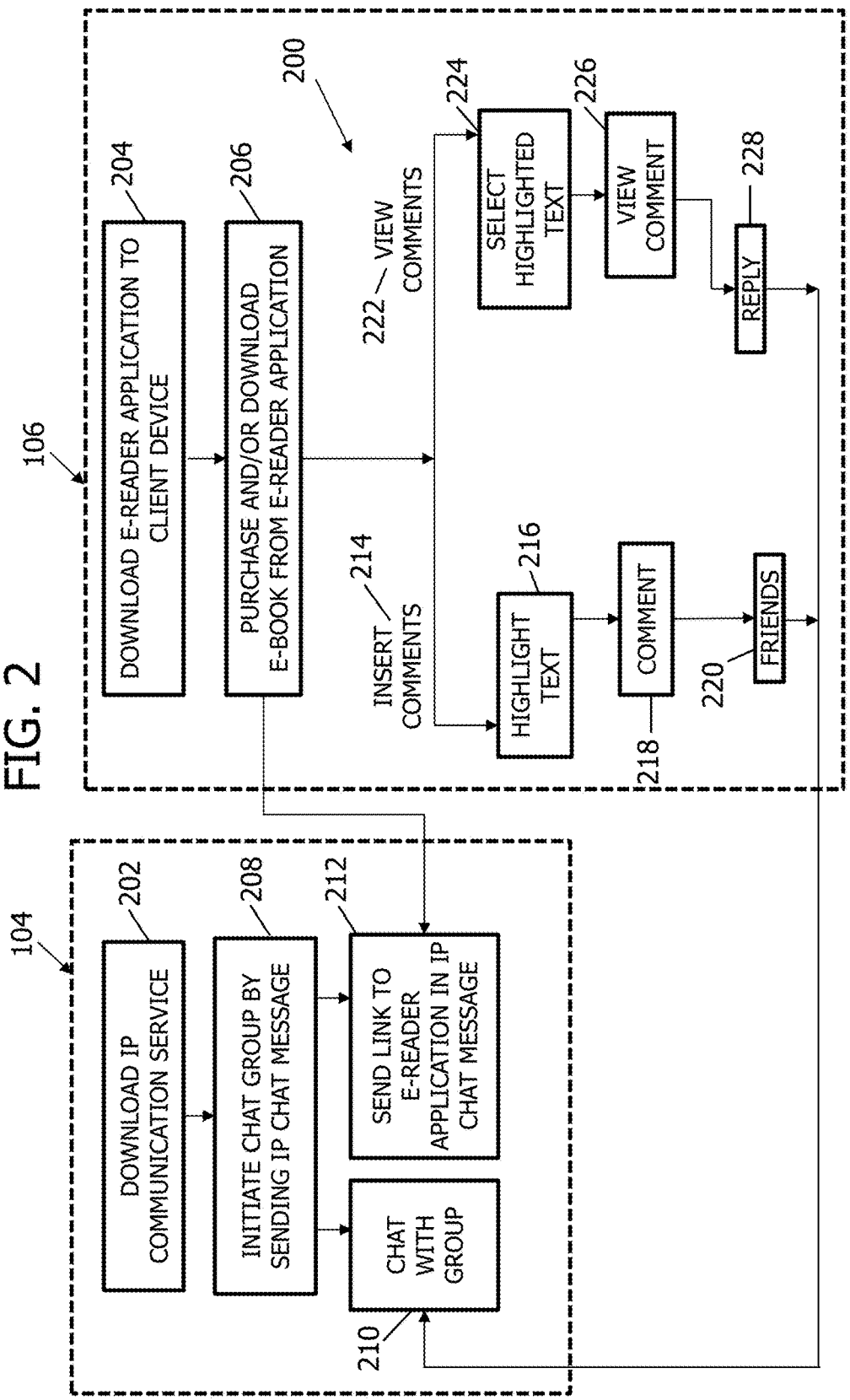
FIG. 2 is a flow diagram of an example method implemented with the system shown in FIG. 1.

FIG. 2 is a flow diagram illustrating a method 200 of using integrated IP chat functionality in a user interface of an e-reader application. Method 200 may be carried out, in an example embodiment, by members of a "virtual book club." Certain functionality in method 200 may be facilitated by e-reader communication platform 102, as shown in FIG. 1; however, certain functions may be considered to be facilitated by components IP communication server 104 and e-reader application server 106, as indicated. "IP chat" refers generally to text-based IP communication. In one example embodiment, a first user 112 (shown in FIG. 1) downloads 202 an IP communication service (e.g., in the form of an app) to her client device 108 (also shown in FIG. 1). The first user 112 may register her client device 108 with the IP communication service as required.

The first user 112 further downloads 204 an e-reader application to her client device 108. The first user 112 may register her client device with the e-reader application as required. The first user 112 may then choose to download and/or purchase 206, using the e-reader application, an e-book, according to the terms and services of the e-reader application. The first user 112 initiates 208 a message or a group message through the IP communication service with other users 114 who have also registered their client devices 110 with the IP communication service. E-reader communication platform 102 may form the chat group (or "group") by transmitting an IP chat message, wherein the IP chat message is accessible through the user interface of the IP communication service (e.g., a "standard" chat message) to the desired recipients. For example, the first user 112 may invite at least one other IP communication service user 114 into an IP chat message in order to chat 210.

The first user 112 may decide to recommend the e-book she has downloaded or purchased to the group. The first user 112 may send 212, in the IP chat message to the group, a link to the e-book, or a link to the download or purchase webpage or application site for the particular e-book through the e-reader application. Alternatively, the first user 112 may select a command from a user interface of the e-reader application that sends 212 an invitation to the chat group to download the e-book.

While reading the e-book, if the first user 112 finds a passage or section of the e-book that she enjoys, dislikes, or otherwise would like to express her opinion about, the first user 112 may wish to insert comments 214. The first user 112 highlights 216 that passage of the e-book text from within the e-reader application. In an example embodiment, the e-reader communication platform 102 may provide for the first user 112 to view. The commands may include, for example, a "Copy" command, to copy the words of the text into an internal clipboard of the client device; a "Highlight" command, to highlight the passage or text on her digital copy of the e-book, to make it easy to find at a later date; a "Select Color" command, which may allow the first user to change the color of the highlighting in the e-book; a "Send" or "Share" command, which copies the text of the passage and embed it into a message in, for example, a social media application; a "Magnify" command, to zoom in on and magnify the highlighted passage; and a "Comment" command 218, which allows the first user 112 to send an embedded IP chat message, which may include a comment about the highlighted passage. E-reader communication platform 102 facilitates display of the embedded IP chat message to the members of the chat group. An embedded IP chat message is an IP chat message that is overlaid on the user interface of the e-reader application, at a location that may be selected by the first user 112, and displayed to the chat group. The comment is then visible to the chat group through the e-reader application on other members' respective client devices.

In some embodiments, selecting the "Highlight" command may prompt e-reader communication platform 102 to provide a second command menu on the user interface of the e-reader application. The second command menu may include privacy options for the highlighting such as "Public" and "Private". Selecting the "Public" option may make the highlighting of the first user 112 visible to all users of the e-reader application reading the same e-book. Selecting the "Private" option may make the highlighting private to the first user 112 such that no other user of the e-reader application can see the highlighting of the passage made by the first user 112. In the example embodiment, there is also a "Friends" option (optionally named "Group", "Contacts", "Open", or any other term that expresses a semi-public nature of the highlighting, as described herein). Selecting the "Friends" option for the "Highlighting" command makes the highlighting semi-public, or only visible to those other users that the first user 112 selects. In some embodiments, selecting the "Friends" option prompts e-reader communication platform 102 to automatically make the first user's highlighting visible to all contacts of the first user 112 in the IP communication service. In other embodiments, selecting the "Friends" option prompts e-reader communication platform 102 to make first user's highlighting available to the member(s) of a particular IP chat message. In other embodiments, selecting the "Friends" option will allow the first user to select the particular contacts to whom the first user 112 wishes to make the first user's highlighting visible.

In some embodiments, selecting the "Comment" command 218 may prompts e-reader communication platform 102 to provide a third command menu on the user interface of the e-reader application. The third command menu may include privacy options for the first user's comments such as "Private" and "Friends" 220. Selecting the "Private" option for the "Comment" command 218 allows the first user 112 to create a private comment or note, such that no other user of the e-reader application can see the private comment or note about the highlighted passage. Selecting the "Friends" option 220 (optionally named "Group", "Contacts", "Open", or any other term that expresses the semi-public nature of the comments) for the "Comment" command 218 allows the first user 112 to create an embedded IP chat message as described above, wherein the embedded IP chat message includes the first user's comments. In some embodiments, selecting the "Friends" option 220 prompts e-reader communication platform 102 to automatically make the first user's embedded IP chat message visible to all contacts of the first user 112 in the IP communication service. In other embodiments, selecting the "Friends" option 220 prompts e-reader communication platform 102 to make first user's comments available to a chat group, or members of an IP chat message of which the first user is also a member. In other embodiments, selecting the "Friends" option 220 will allow the first user 112 to select the particular contacts to whom the first user 112 wishes to make the embedded IP chat message visible. In some embodiments, selection of the "Private" option after selection of the "Friends" option may cause the e-reader communication platform 102 to remove the embedded IP chat message and turn the content of the comment into a note that is only visible to the first user 112.

The member(s) of a chat group can respond to the comment made by the first user 112 in the embedded IP chat message, chat 210 with user in an IP chat message on the user interface of the IP chat service, or initiate 208 another embedded IP chat message.

In other embodiments, the first user 112 may receive a link to an e-book from a second user 114 of the chat group. The first user 112 may alternatively, receive an invitation through the e-reader application to download the e-book and join a chat group. The first user 112 may then download and/or purchase 206 the e-book and may view 222 embedded IP chat messages and/or highlighted passages of the e-book that have been created by other members of the chat group. The first user 112 may select 224 a highlighted passage, and e-reader communication platform 102 may provide a menu of commands for the first user 112 to view. The commands of the command menu may include, for example, a "View Comment" command 226, which would, as described above, allow the first user 112 to view a comment within an embedded IP chat message made by the second user 114. Selecting the "View Comment" command 226 may allow the first user 112 to respond to the comment within the embedded IP chat message. Optionally, the first user 112 may have to select a "Reply" command 228 in order to respond within the embedded IP chat message. The command menu may also include a "Copy" command, to copy the words of the text into an internal clipboard of the client device 108; a "Magnify" command, to zoom in on and magnify the highlighted passage; and a "Send" or "Share" command, which may copy the text of the passage and embed it into a message in, for example, a social media application.

Figure 3:
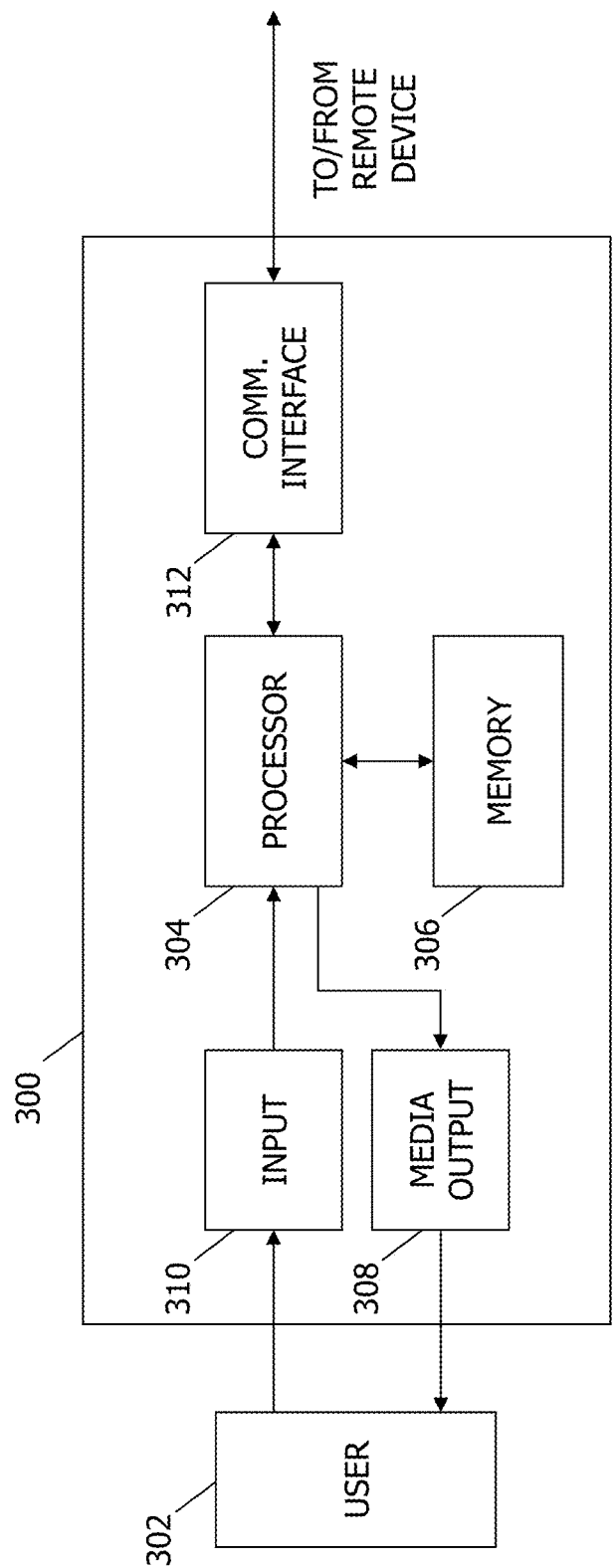
FIG. 3 illustrates an example configuration of a client device as shown in FIG. 1.

FIG. 3 illustrates an exemplary configuration of a client device 300, such as client devices 108, 110, operated by a user 302. Client device 300 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or other data to be stored and retrieved. Memory area 306 may include one or more computer readable media.

Client device 300 also includes at least one media output component 308 for presenting information to user 302. Media output component 308 is any component capable of conveying information to user 302. In some embodiments, media output component 308 includes an output adapter such as a video adapter and/or an audio adapter. An output adapter is operatively coupled to processor 304 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client device 300 includes an input device 310 for receiving input from user 302. Input device 310 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 308 and input device 310.

Client device 300 may also include a communication interface 312, which is communicatively couplable to a remote device, such as server system 102. Communication interface 312 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 306 are, for example, computer readable instructions for providing a user interface to user 302 via media output component 308 and, optionally, receiving and processing input from input device 310. A user interface may include, among other possibilities, a web browser and client application. Web browsers enable users, such as user 302, to display and interact with media and other information typically embedded on a web page or a website from server system 102. A client application allows user 302 to interact with a server application from server system 102.

Figure 4:
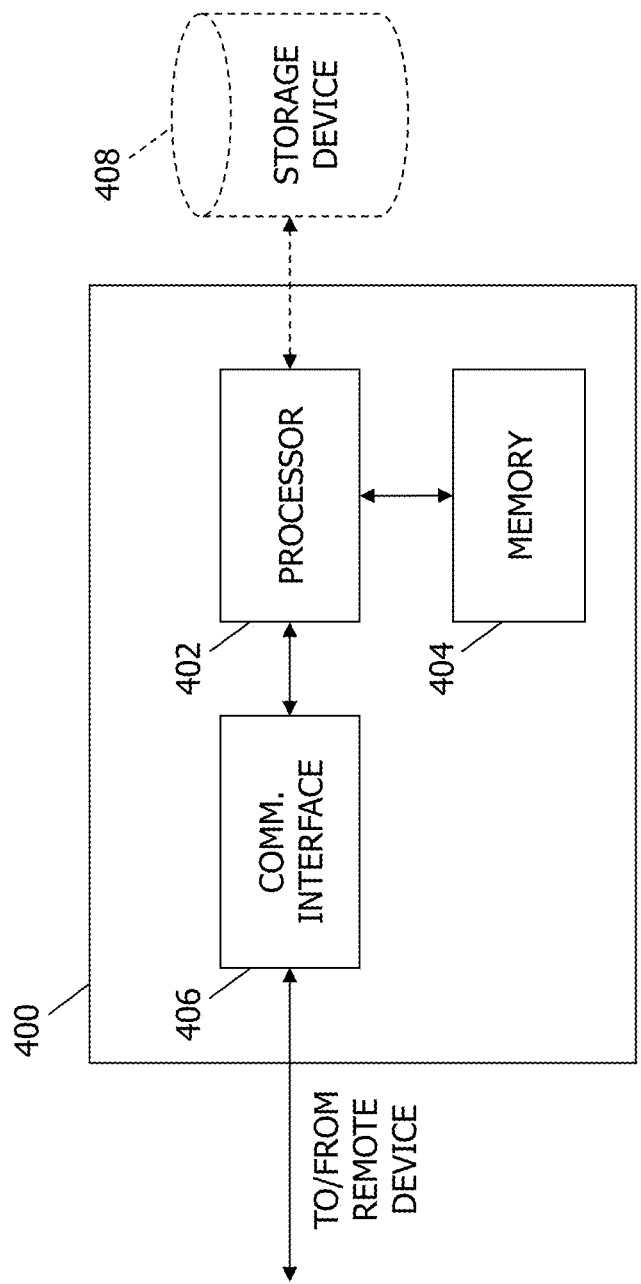
FIG. 4 illustrates an example configuration of a server computer device as shown in FIG. 1.

FIG. 4 illustrates an exemplary configuration of a server computer device 400 such as e-reader communication platform 102, IP communication server 104, and/or or e-reader application server 106. Server computer device 400 includes a processor 402 for executing instructions. Instructions may be stored in a memory area 404, for example. Processor 402 may include one or more processing units (e.g., in a multi-core configuration).

Processor 402 is operatively coupled to a communication interface 406 such that server computer device 400 is capable of communicating with a remote device such as client device 300 or another server computer device 400. Processor 402 may also be operatively coupled to a storage device 408. Storage device 408 is any computer-operated hardware suitable for storing and/or retrieving data. In some embodiments, storage device 408 is integrated in server computer device 400. For example, server computer device 400 may include one or more hard disk drives as storage device 408. In other embodiments, storage device 408 is external to server computer device 400 and may be accessed by a plurality of server computer devices 400. For example, storage device 408 may include multiple storage units such as hard disks or solid state disks in a redundant array of inexpensive disks (RAID) configuration. Storage device 408 may include a storage area network (SAN) and/or a network attached storage (NAS) system.

Memory areas 306 and 404 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
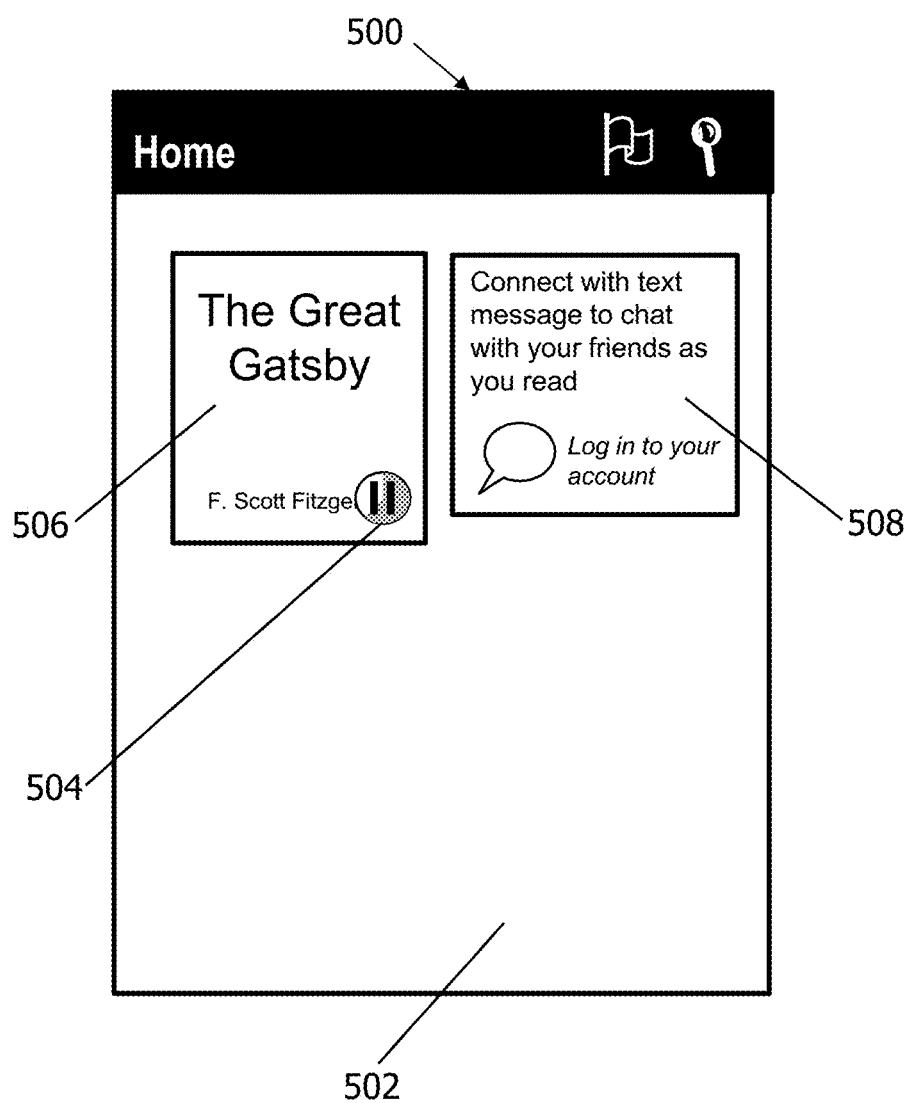
FIG. 5 is a diagram of a first example user interface of an e-reader application, accessible on a client device as shown in FIG. 1.

FIG. 5 shows a screen capture 500 of an example e-reader application user interface 502 on a client device 108 of a user 112 (shown in FIG. 1). A user 112 may be downloading or reading an e-book 506, as indicated by a progress indicator 504. In some embodiments, the e-reader application user interface 502 will display a connect command 508 to connect to a user's contacts in an IP communication service, to invite members of an IP chat message to download the e-book, and/or to initiate an IP chat message. In some embodiments, the e-reader application user interface 502 will display a command to connect to a user's profile on a social media network, website, or application.

Figure 6:
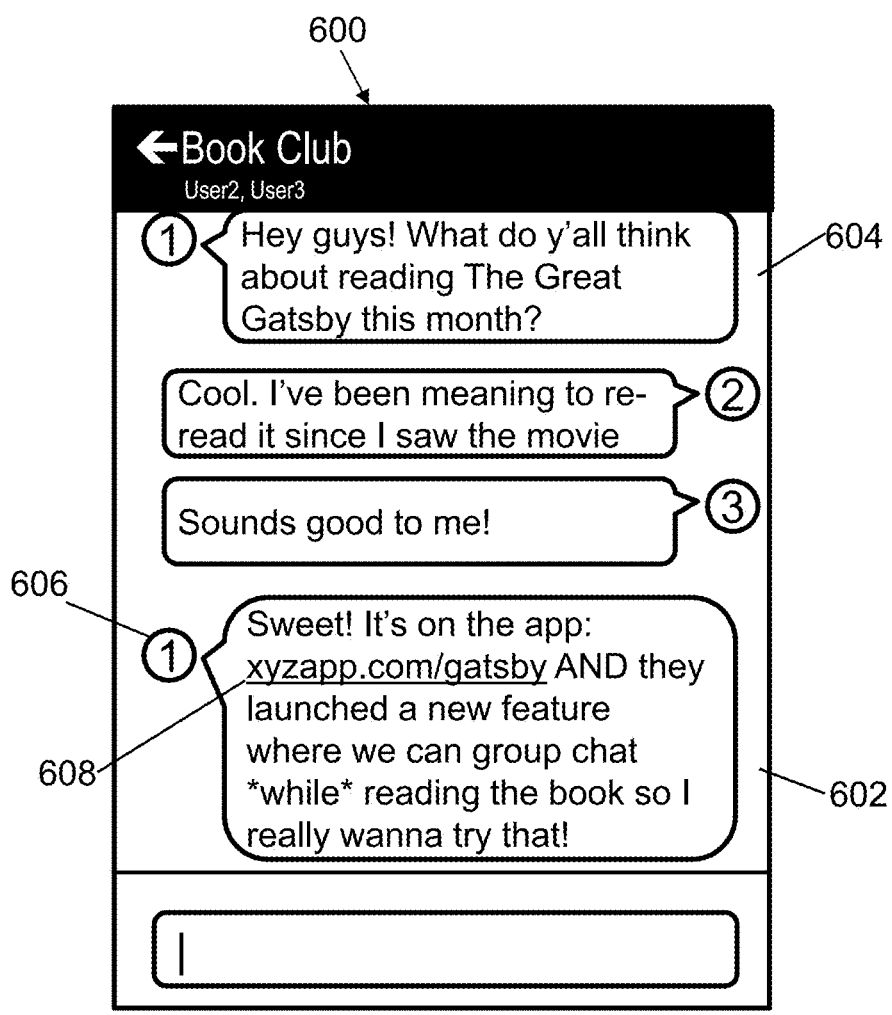
FIG. 6 is a diagram of an example Internet Protocol (IP) communication service user interface displaying an example IP chat message, accessible on a client device as shown in FIG. 1.

FIG. 6 shows a screen capture 600 of an example IP communication service user interface 602 displaying an IP chat message 604. A member 606 (e.g., user 112, shown in FIG. 1) of the IP chat message 604 chat group is sending a link 608 to other members of the chat group (i.e., "User2"

and "User3") to the e-book 506 (shown in FIG. 5) available to purchase and/or download through the e-reader application.

Figure 7:
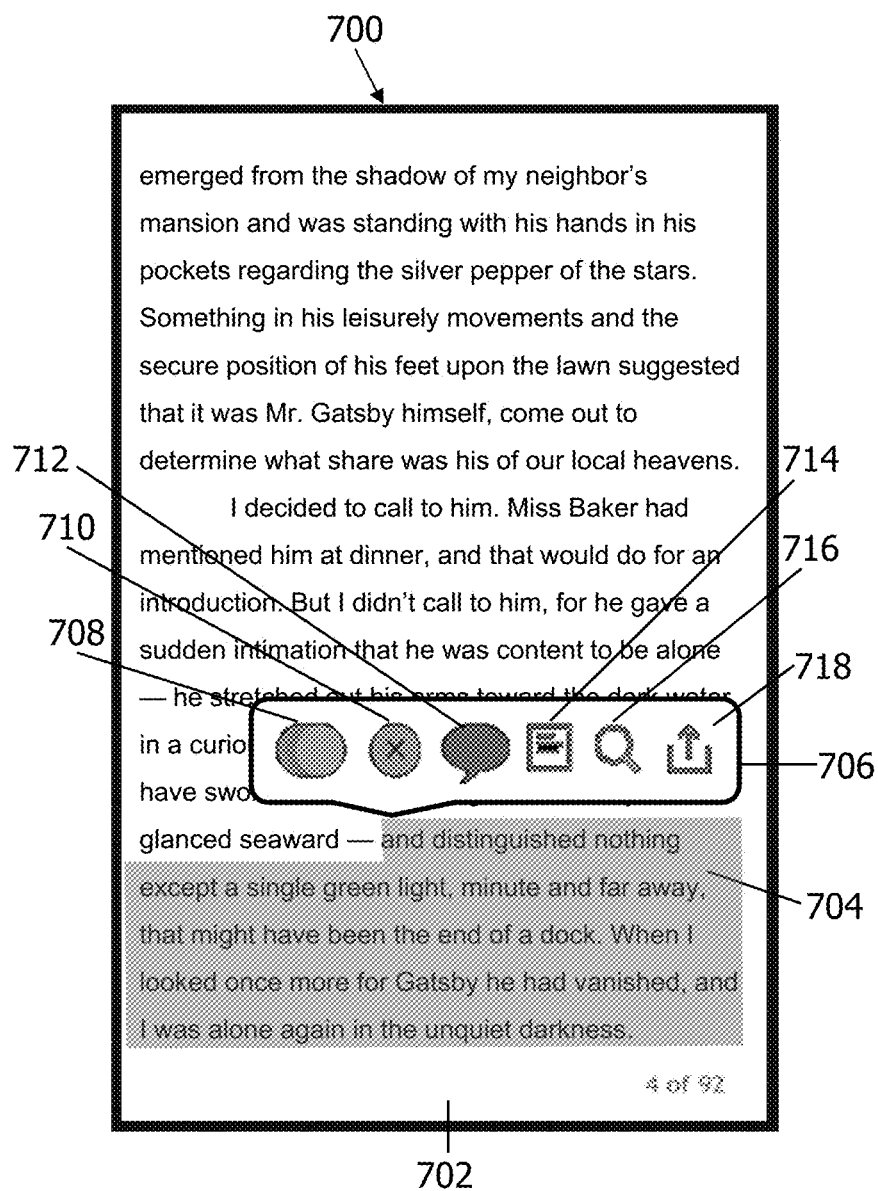
FIG. 7 is a diagram of a second example user interface of an e-reader application displaying an example e-book, accessible on a client device as shown in FIG. 1.

FIG. 7 shows a screen capture 700 of an example e-reader application user interface 702. A user has highlighted a passage 704, and a command menu 706 is available with a "Select Color" command 708, a "Remove Highlight" command 710, a "Comment" command 712, which will call the IP chat service and allow the user to send an embedded IP chat message including a comment, a "Note" command 714, which allows a user to make a private comment visible only to the user, a "Magnify" command 716, and a "Share" command 718.

Figure 8:
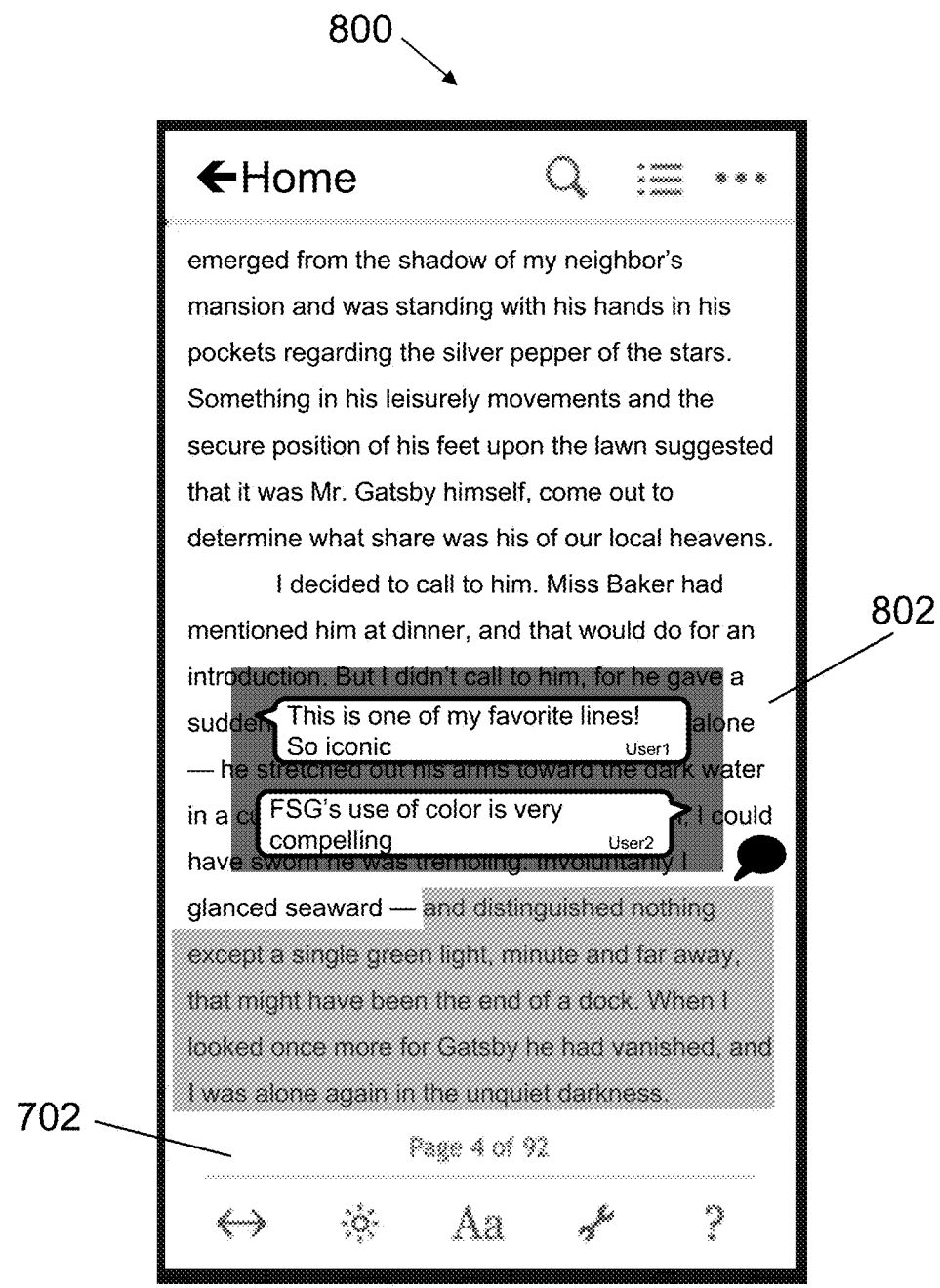
FIG. 8 is a diagram of a third example user interface of an e-reader application displaying the incorporated IP communication service as an overlaid IP chat message, implemented using the system shown in FIG. 1.

FIG. 8 is a screen capture 800 of the example e-reader application user interface 702 (shown in FIG. 7) with an embedded IP chat message 802 overlaid thereupon. In some embodiments, a user may have an e-reader application active on her client device and highlight a passage of text as described above with respect to FIG. 2. A menu of commands may then appear for user 112 (shown in FIG. 1) to view. By selecting a "Comment" command, the IP communication service may then be called on the client device, enabling the user to submit an embedded IP chat message.

It is contemplated that the system described herein may be used, for example, in the field of education, as well as for "virtual book clubs" (though by no means are the two examples meant to limit the applications of the present disclosure). For example, a textbook or a novel may be assigned by an educator for a class of students to read. The educator may require or suggest that the students purchase or download the textbook or novel as assigned through the e-reader application, rather than purchase a "hard" copy or "paper" copy. The educator may have a copy of the textbook or novel on their client device and, in advance of assigning the textbook or novel to the students, may select certain passages of text of which the educator would like students to take particular notice. In this example, the educator will highlight these passages of text as described above and, as also described, will use the "Comment" command to submit any number of embedded IP chat messages that will be displayed to the students. The educator may include a comment or a question related to the passage of text.

The class of students, having client devices registered to the IP communication service and the e-reader application, and having purchased and/or downloaded the textbook or novel on the e-reader application, will see the highlighted passages that have been highlighted by the educator. One or more of the students may then select the highlighted passage(s) and view the embedded IP chat message that include the comments or questions from the educator. The one or more students may then have the option to respond to the comment or question in the embedded IP chat message, thus having the opportunity to further their understanding of the assigned textbook or novel by asking and answering questions and/or engaging in discussion with other students or with the educator.

Figure 9:
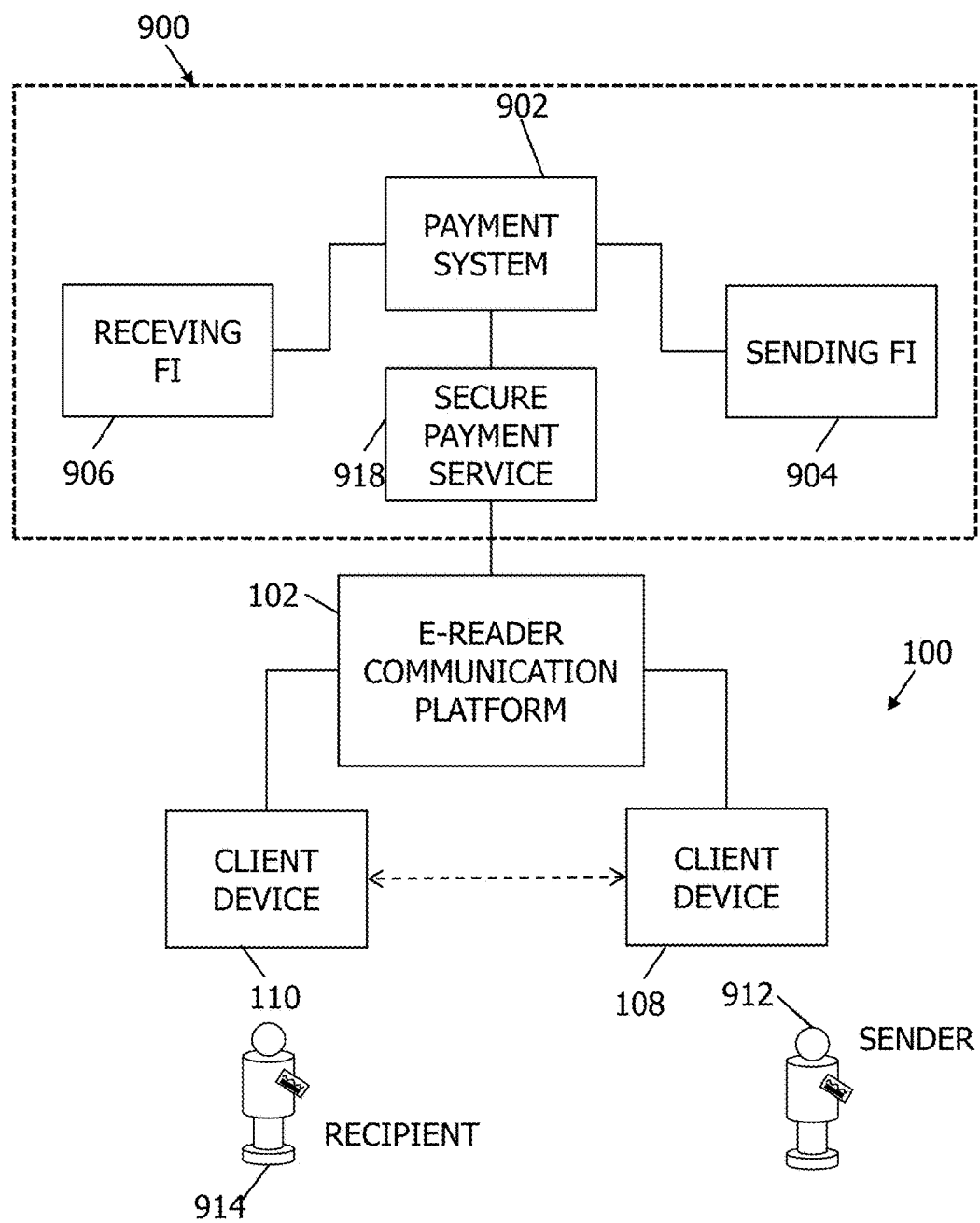
FIG. 9 is a block diagram that illustrates a person-to-person (P2P) funds transfer system 900 in communication with the system shown in FIG. 1.

FIG. 9 is a block diagram that illustrates a person-to-person (P2P) funds transfer system 900 in communication with the integrated e-reader communication system 100 shown in FIG. 1. For example, in a "virtual book club," in a classroom setting, or in any other application of the e-reader communication system 100, one member of a chat group may wish to send money to another member of the chat group. The virtual book club may also meet and discuss books in person, for example, and one member may wish to send funds to another member to cover her share of refreshments for an in-person book club meeting. Two students in the same class may wish to see a movie version of a book they have read for class, for example, and one student may wish to send funds to the other student to cover the cost of their ticket.

The P2P funds transfer system 900 includes a payment system 902. As will be seen, the payment system 902 operates to route and clear funds transfers from the payment accounts of senders to the payment accounts of recipients. Payment system 902 may include an existing payment processing network. As shown, P2P funds transfer system includes a secure payment service (SPS) 918, which is in communication with the e-reader communication platform 102. SPS 918 is accessed by a sender 912 and/or a recipient 914 using client devices 108, 110, respectively. For example, SPS 918 may be accessed by a platform integrated into the e-reader application and/or into the IP communication application. Sender 912 may be similar to user 112, shown in FIG. 1, and recipient 914 may be similar to user 114, also shown in FIG. 1.

P2P funds transfer system 900 may include or interlink many financial institutions (FIs) that act as issuers of payment accounts, but for purposes of illustration only two such FIs are shown in FIG. 9, namely the financial institution (sending FI 904) that issued the payment account of the sender 912 of funds, and the financial institution (receiving FI 906) that issued the payment account of the recipient 914 of the funds.

Also shown as part of the P2P funds transfer system 900 is SPS 918 that provides functionality in accordance with aspects of the present invention. SPS 918 may, for example, be a P2P services provider, and may be a point of contact between the funds sender 914 and the P2P funds transfer system 900 (e.g., through an Application Programming Interface (API)). As will be understood in light of subsequent discussion, SPS 918 may initiate transactions in the payment system 902, and may exchange information with the sending and/or receiving FIs 904, 906, to implement services that are provided in accordance with aspects of the present disclosure. SPS 918 may obtain its access to the payment system 902 under contract with the payment system 902 or alternatively may be directly affiliated with and/or operated by the payment system 902.

Each block shown in FIG. 9 should be understood to represent the indicated entity and also one or more computers operated by the indicated entity. Thus, in addition to showing relationships among various parties that make up the P2P funds transfer system 900, FIG. 9 also depicts a network of computers that exchange information for the purpose of implementing remittance transactions in the system 900.

Sender 912 may wish to send funds to recipient 914 and therefore may contact SPS 918, such as via electronic communication. It is to be understood that the sender 912 may previously have enrolled as a user with SPS 918 and thus may have a user account with SPS 918. Such enrollment may include providing funding account payment credentials to SPS 918 to identify sender 912. Funding account payment credentials can include, but are not limited to, name, date of birth, physical address, telephone number, Social Security Number (SSN), and account numbers, wherein account numbers may include credit card numbers, bank account numbers, and debit card numbers. The user account may designate, using an account number, or be associated with a sender's payment account that is to be used for funding P2P transactions. In addition, recipient 914 may have also previously enrolled with SPS 918 and may also have a user account with SPS 918, which may designate or otherwise be associated with a recipient's payment account that is to be used for receiving funds transferred in P2P transactions.

Sender 912 may access SPS 918 directly or may access SPS 918 using e-reader communication platform 102. For example, sender 912 may user e-reader communication platform 102 to send a P2P transaction request to SPS 918. The transaction request includes information to specify details of the P2P transaction that sender 912 wishes to initiate. For example, sender 912 may specify an amount of money to be transferred and recipient 914 of the funds. Recipient 914 may be designated, for example, by a user account identifier, by name, or by phone number.

E-reader communication platform 102 may transmit the request to SPS 918. SPS 918 may initiate a transaction authorization request in the payment system 902. The transaction authorization request may be routed via the payment system 902 to the sending FI 904 using the payment card account number that identifies the sender's payment card account issued by the sending FI 904. The purpose of the transaction authorization request is to confirm the availability of funds or credit in the sender's account to support the proposed remittance transaction. Another purpose of the authorization request is to put a hold on the funds or credit in the sender's account, in the amount of the requested remittance, until the remittance transaction is completed. If the request is accepted, an authorization code is issued to the SPS 918 in an authorization response. The response may be initiated via the sending FI 904 and routed via the payment system 902 back to the SPS 918. For credit card account transactions, when a request for authorization is accepted, the available credit line or available balance of the sender's payment card account is decreased. A charge may not be immediately posted to the sender's account, but a hold may be placed on the account until the time the charge is made. For debit card transactions, when a request for a PIN authorization is approved by the sending FI, the sender's payment card account is decreased. Normally, a charge is posted immediately to the sender's account, and a credit is immediately posted to the recipient's account. SPS 918 routes a payment disposition notification to sender 912 for display on client device 108. SPS 918 further transmits the payment notification to recipient 914 for display on client device 110.

Figure 10:
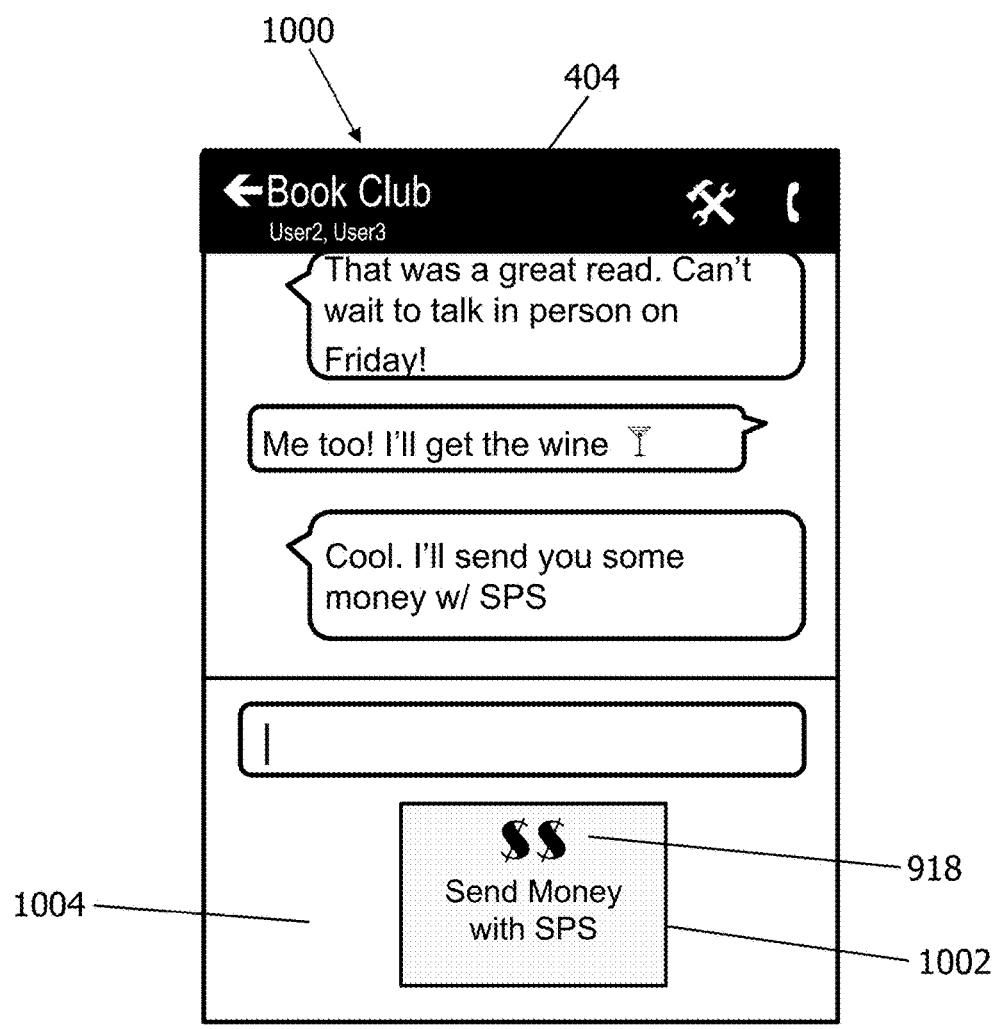
FIG. 10 is a diagram of another example IP communication service displaying an IP chat message with an embedded secure payment service (SPS) command, implemented using the system shown in FIG. 9.

FIG. 10 is a screen capture 1000 of example IP chat message 404 on a client device. In some embodiments, SPS 918 (as shown in FIG. 9) may be communicatively coupled with the IP communication service such that the SPS 918 may be accessed through the user interface of the IP communication service. For example, a user may be able to open IP chat message 404 and select SPS option 1002 from a command menu 1004 to access SPS 918 directly from within the IP chat message 404.

Figure 11:
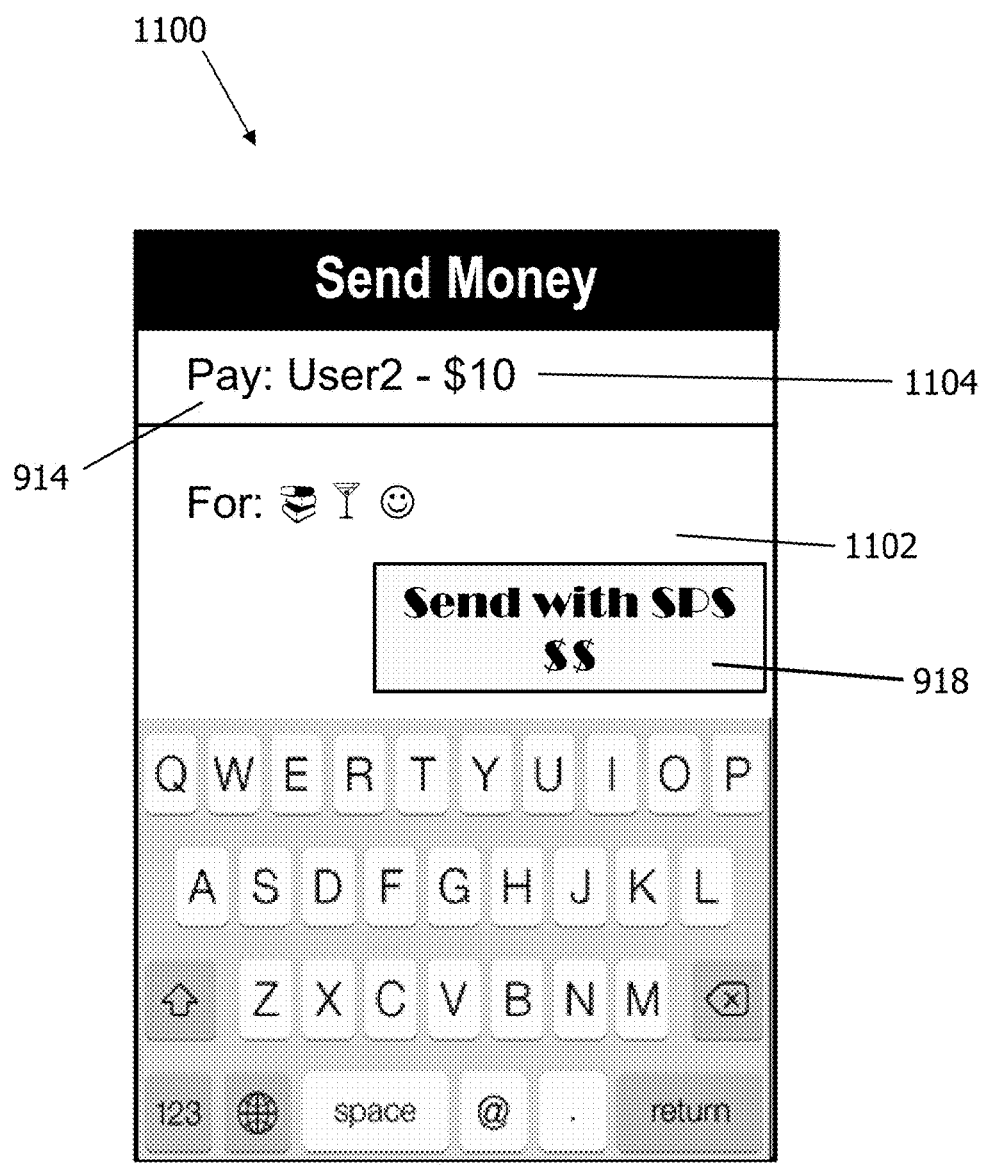
FIG. 11 is an example user interface of the SPS for implementing a P2P funds transfer using the system shown in FIG. 9.

FIG. 11 is a screen capture 1100 of an example SPS application user interface 1102 for which a user, e.g., sender 912 (as shown in FIG. 9), may transfer money 1104 to another user, e.g., recipient 914 (also shown in FIG. 9). The sender may choose the amount of money 1104 she would like to transfer from a sender account to a recipient account of recipient 914, provided the recipient 914 is also registered with SPS 918 (shown in FIG. 9), according to the terms and services of SPS 918.

Figure 12:
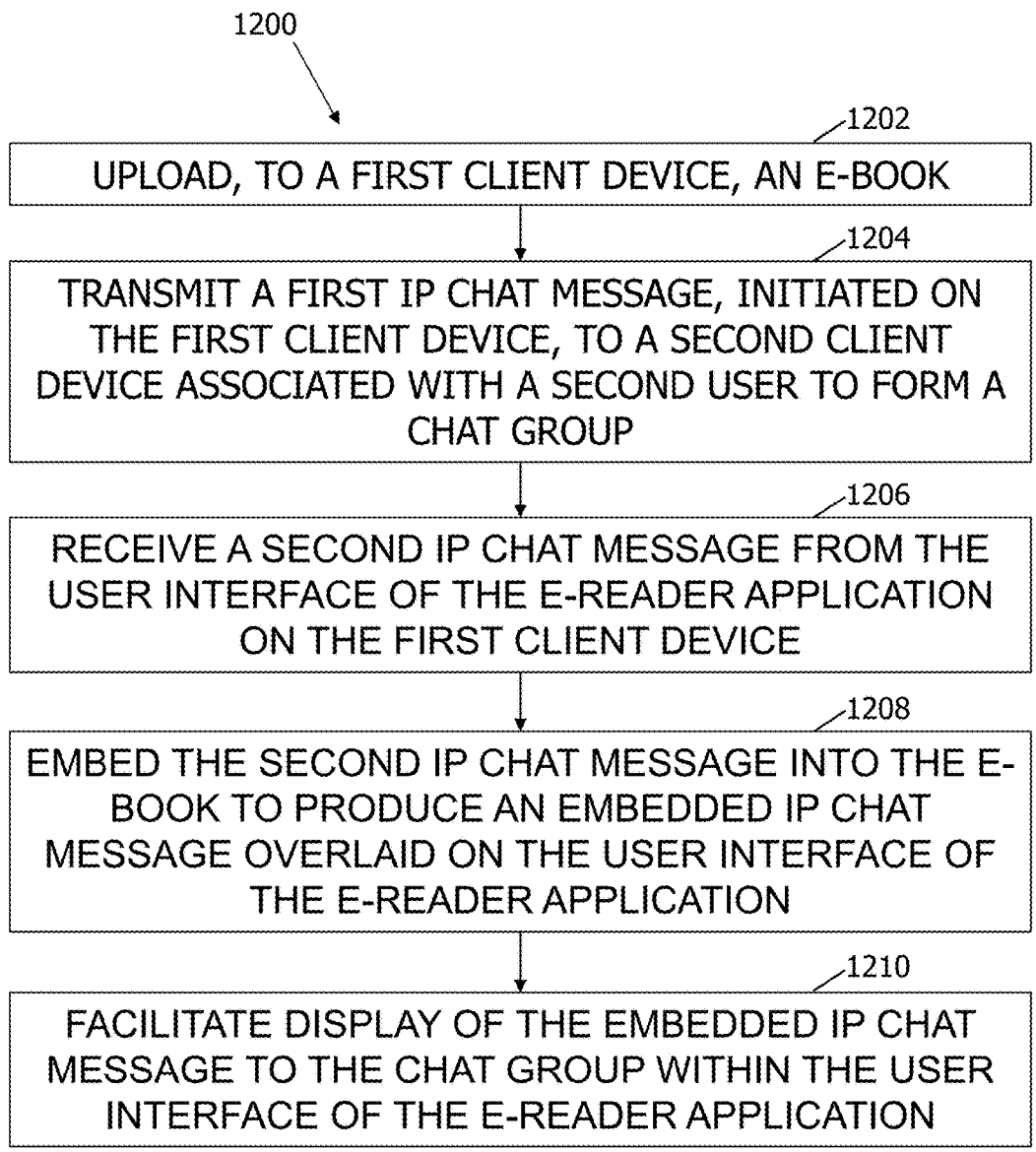
FIG. 12 is a flowchart of an example process implemented by the e-reader communication platform shown in FIG. 1 for integrating chat functionality into an e-reader application.

FIG. 12 is a flowchart of an example process 1200 implemented by the e-reader communication platform 102 (shown in FIG. 1) for integrating a chat function into an e-reader application. Method 1200 includes uploading 1202 an e-book to a first client device (e.g., client device 108, shown in FIG. 1). The first client device is associated with a first user (e.g., user 112), and the e-book is accessed using the e-reader application. Method 1200 also includes transmitting 1204 a first IP chat message to a second client device (e.g., client device 110). The first IP chat message is initiated on the first client device. The second client device is associated with a second user (e.g., user 114). The first IP chat message may be an invitation to form a chat group including the first user and the second user.

Method 1200 further includes receiving 1206 a second IP chat message from the user interface of the e-reader application on the first client device, and embedding 1208 the second IP chat message into the e-book to produce an embedded IP chat message. The embedded IP chat message is overlaid on the user interface of the e-reader application. Method 1200 also includes facilitating display 1210 of the embedded IP chat message to each user in the chat group on a respective client device within the user interface of the e-reader application.

Figure 13:
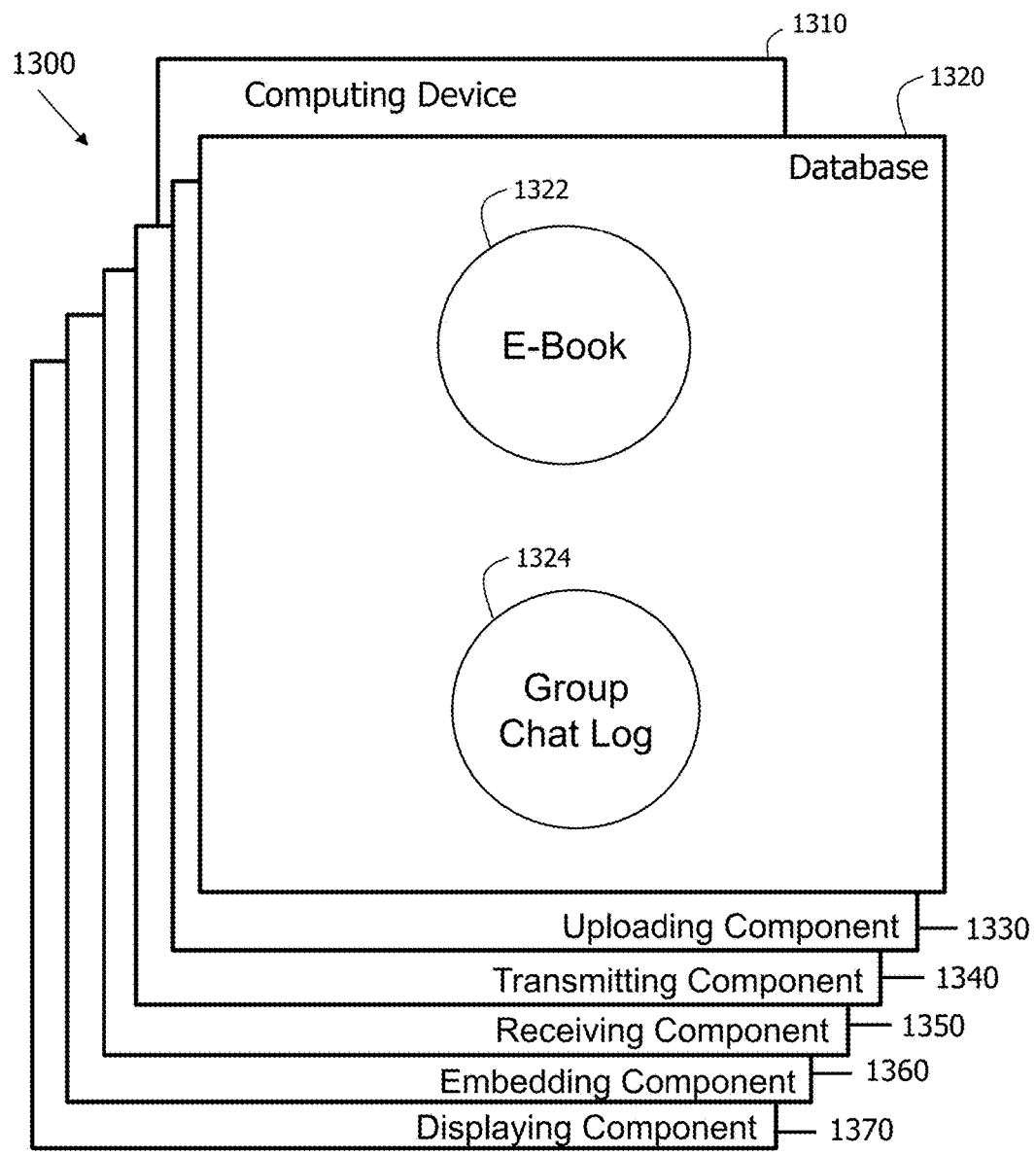
FIG. 13 is a diagram of component of one or more example computing devices that may be used in the systems shown in FIG. 1 and FIG. 9.

FIG. 13 is a diagram of components 1300 of one or more example computing devices 1310 that may be used in the systems shown in FIG. 1 and FIG. 9. Computing device 1310 may include, but is not limited to, e-reader communication platform 102 (shown in FIG. 1). A database 1320 may be coupled with several separate components within computing device 1310, which perform specific tasks. In this embodiment, database 1320 includes at least one e-book 1322 and a group chat log 1324. The group chat log 1324 may include one or more message transmitted to and received from members of a chat group within the e-reader application.

In the example embodiment, computing device 1310 includes an uploading component 1330, which may be configured to upload, to a first client device, an e-book 1322. The first client device is associated with a first user, and the e-book 1322 is accessed using the e-reader application. Computing device 1310 also includes a transmitting component 1340 for transmitting a first IP chat message, initiated on the first client device, to a second client device associated with a second user to form a chat group including the first user and the second user. Computing device 1310 further includes a receiving component 1350, which is configured to receive a second IP chat message from the user interface of the e-reader application on the first client device. The first and/or the second IP chat message(s) may be stored in group chat log 1324.

Computing device 1310 further includes an embedding component 1360 (or converting component) configured to embed the second IP chat message into the e-book to produce an embedded IP chat message (in other words, to convert the second IP chat message into an embedded IP chat message). The embedded IP chat message is overlaid on the user interface of the e-reader application. Computing device 1310 also includes a displaying component 1370. Displaying component 1370 is configured to facilitate display of the embedded IP chat message to each user in the chat group on a respective client device within the user interface of the e-reader application.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the e-reader communication platform are described herein as including general processing and memory devices, it should be understood that the e-reader communication platform is a specialized computer configured to perform the steps described herein for integrating a chat function into an e-reader application.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for integrating a chat function and person-to-person (P2P) payments into an e-reader application using an e-reader communication platform including at least one processor in communication with at least one memory, said method comprising:

facilitating downloading, on a first client device, the e-reader application, wherein the first client device is associated with a first user;

facilitating downloading, to the first client device, an e-book, wherein the e-book is accessed using the e-reader application;

facilitating downloading, on the first client device, an Internet Protocol (IP) communication service;

receiving a user selection of a command from within a user interface of the e-reader application stored on the first client device to transmit a first IP chat message, initiated on the first client device, to at least one other client device including a second client device associated with a second user to form a chat group including the first user and at least the second user using the IP communication service;

transmitting a link, within the first IP chat message, to the second client device to download the e-book onto the second client device from within the user interface of the e-reader application stored on the second client device;

receiving a second IP chat message initiated at one of the first client device and the second client device from within the user interface of the e-reader application stored on the one of the first client device and the second client device using the IP communication service;

embedding the second IP chat message into the e-book to produce an embedded IP chat message, wherein the embedded IP chat message is overlaid on the user interface of the e-reader application stored on the first client device;

facilitating display of the embedded IP chat message to each user in the chat group within a respective e-book on a respective client device within the user interface of the e-reader application stored on the respective client device;

transmitting a third IP chat message, initiated on one client device associated with a respective user in the chat group, to at least another client device associated with another user in the chat group;

receiving, in association with the third IP chat message, a request for a transfer of funds from a sender client device, the request identifying an amount of funds to be transferred and a recipient of the funds;

transmitting the request to a secure payment service (SPS), wherein the SPS is associated with a P2P payment system to facilitate the transfer of funds from a sender account associated with the respective user of the sender client device to a recipient account associated with the recipient; and receiving, upon completion of the transfer of funds, a payment notification from the SPS for display on the sender client device.

2. The method of claim 1, further comprising:

receiving highlighting, from the first client device, of a passage of text within the e-book, wherein the embedded IP chat message is associated with the highlighting of the passage of text, and wherein the embedded IP chat message includes a comment;

facilitating display of the highlighting of the passage of the text to each user in the chat group;

receiving, from the second client device, a reply to the comment within the embedded IP chat message; and facilitating display of the reply to each user of the chat group within the embedded IP chat message.

3. The method of claim 2, further comprising:

providing a command menu on the user interface of the e-reader application, the command menu associated with the highlighting of the passage of text; and receiving a selection of a group command from the first user device indicating that the first user desires that the highlighting be displayed to each member of the chat group.

4. The method of claim 1 further comprising:

providing a command menu on the user interface of the e-reader application, the command menu associated with the second IP chat message;

receiving selection of a private command from the first user device indicating the first user desires that the content of the second IP chat message only be visible to the first user; and removing the embedded IP chat message from the e-book.

5. The method of claim 4, further comprising embedding a note in the e-book, wherein the note is only visible on the first client device.

6. The method of claim 1, wherein the recipient is the second user in the chat group, wherein the second user is a plurality of second users included in the chat group, and wherein the recipient is one or more of the plurality of second users.

7. An e-reader communication platform for integrating a chat function and person-to-person (P2P) payments into an e-reader application, comprising at least one processor in communication with at least one memory device, wherein said at least one processor is programmed to:

facilitate downloading, on a first client device, the e-reader application, wherein the first client device is associated with a first user;

facilitate downloading, to the first client device, an e-book, wherein the e-book is accessed using the e-reader application;

facilitate downloading, on the first client device, an Internet Protocol (IP) communication service;

receive a user selection of a command from within a user interface of the e-reader application stored on the first client device to transmit a first IP chat message, initiated on the first client device, to at least one other client device including a second client device associated with a second user to form a chat group including the first user and at least the second user using the IP communication service;

transmit a link, within the first IP chat message, to the second client device to download the e-book onto the second client device from within the user interface of the e-reader application stored on the second client device;

receive a second IP chat message initiated at one of the first client device and the second client device from within the user interface of the e-reader application stored on the one of the first client device and the second client device using the IP communication service;

embed the second IP chat message into the e-book to produce an embedded IP chat message, wherein the embedded IP chat message is overlaid on the user interface of the e-reader application stored on the first client device;

facilitate display of the embedded IP chat message to each user in the chat group within a respective e-book on a respective client device within the user interface of the e-reader application;

transmit a third IP chat message, initiated on one client device associated with a respective user in the chat group, to at least another client device associated with another user in the chat group;

receive, in association with the third IP chat message, a request for a transfer of funds from a sender client device, the request identifying an amount of funds to be transferred and a recipient of the funds;

transmit the request to a secure payment service (SPS), wherein the SPS is associated with a P2P payment system to facilitate the transfer of funds from a sender account associated with the respective user of the sender client device to a recipient account associated with the recipient; and receive, upon completion of the transfer of funds, a payment notification from the SPS for display on the sender client device.

8. The e-reader communication platform of claim 7, wherein said at least one processor is further programmed to:

receive highlighting, from the first client device, of a passage of text within the e-book, wherein the embedded IP chat message is associated with the highlighting of the passage of text, and wherein the embedded IP chat message includes a comment;
facilitate display of the highlighting of the passage of the text to each user in the chat group;
receive, from the second client device, a reply to the comment within the embedded IP chat message; and
facilitate display of the reply to each user of the chat group within the embedded IP chat message.

9. The e-reader communication platform of claim 8, wherein said at least one processor is further programmed to:
provide a command menu on the user interface of the e-reader application, the command menu associated with the highlighting of the passage of text; and
receive a selection of a group command from the first user device indicating that the first user desires that the highlighting be displayed to each member of the chat group.

10. The e-reader communication platform of claim 8, wherein said at least one processor is further programmed to embed a note in the e-book, wherein the note is only visible on the first client device.

11. The e-reader communication platform of claim 7, wherein said at least one processor is further programmed to:
provide a command menu on the user interface of the e-reader application, the command menu associated with the second IP chat message;
receive selection of a private command from the first user device indicating the first user desires that the content of the second IP chat message only be visible to the first user; and
remove the embedded IP chat message from the e-book.

12. The e-reader communication platform of claim 7, wherein the recipient is the second user in the chat group, wherein the second user is a plurality of second users included in the chat group, and wherein the recipient is one or more of the plurality of second users.

13. A computer-readable storage medium having computer-executable instructions embodied thereon, wherein when executed by an e-reader communication platform including at least one processor in communication with at least one memory, the computer-executable instructions cause the e-reader communication platform to:
facilitate downloading, on a first client device, the e-reader application, wherein the first client device is associated with a first user;
facilitate downloading, to the first client device, an e-book, wherein the e-book is accessed using the e-reader application;
facilitate downloading, on the first client device, an Internet Protocol (IP) communication service;
receive a user selection of a command from within a user interface of the e-reader application stored on the first client device to transmit a first IP chat message, initiated on the first client device, to at least one other client device including a second client device associated with a second user to form a chat group including the first user and at least the second user using the IP communication service;
transmit a link, within the first IP chat message, to the second client device to download the e-book onto the second client device from within the user interface of the e-reader application stored on the second client device;
receive a second IP chat message initiated at one of the first client device and the second client device from within the user interface of the e-reader application stored on the one of the first client device and the second client device using the IP communication service;
embed the second IP chat message into the e-book to produce an embedded IP chat message, wherein the embedded IP chat message is overlaid on the user interface of the e-reader application stored on the first client device;
facilitate display of the embedded IP chat message to each user in the chat group within a respective e-book on a respective client device within the user interface of the e-reader application;
transmit a third IP chat message, initiated on one client device associated with a respective user in the chat group, to at least another client device associated with another user in the chat group;
receive, in association with the third IP chat message, a request for a transfer of funds from a sender client device, the request identifying an amount of funds to be transferred and a recipient of the funds;
transmit the request to a secure payment service (SPS), wherein the SPS is associated with a P2P payment system to facilitate the transfer of funds from a sender account associated with the respective user of the sender client device to a recipient account associated with the recipient; and
receive, upon completion of the transfer of funds, a payment notification from the SPS for display on the sender client device.

14. The computer-readable storage medium of claim 13, wherein said computer-readable instructions further cause the e-reader communication platform to:
receive highlighting, from the first client device, of a passage of text within the e-book, wherein the embedded IP chat message is associated with the highlighting of the passage of text, and wherein the embedded IP chat message includes a comment;
facilitate display of the highlighting of the passage of the text to each user in the chat group;
receive, from the second client device, a reply to the comment within the embedded IP chat message; and
facilitate display of the reply to each user of the chat group within the embedded IP chat message.

15. The computer-readable storage medium of claim 14, wherein said computer-readable instructions further cause the e-reader communication platform to:
provide a command menu on the user interface of the e-reader application, the command menu associated with the highlighting of the passage of text; and
receive a selection of a group command from the first user device indicating that the first user desires that the highlighting be displayed to each member of the chat group.

16. The computer-readable storage medium of claim 13, wherein said computer-readable instructions further cause the e-reader communication platform to:
provide a command menu on the user interface of the e-reader application, the command menu associated with the second IP chat message;
receive selection of a private command from the first user device indicating the first user desires that the content of the second IP chat message only be visible to the first user;
remove the embedded IP chat message from the e-book; and embed a note in the e-book, wherein the note is only visible on the first client device.

17. The computer-readable storage medium of claim 13, wherein the recipient is the second user in the chat group, wherein the second user is a plurality of second users included in the chat group, and wherein the recipient is one or more of the plurality of second users.

\* \* \* \* \*